No. 676,044. Patented June 11, 1901.
B. H. LOCKE.
MECHANISM FOR CONVERTING ROTARY INTO RECIPROCATING MOTION.
(Application filed Feb. 23, 1900.)
(No Model.) 2 Sheets—Sheet 1.

Attest:
A. N. Jesbera
J. M. Scoble

Inventor:
Bradford H. Locke
by Redding, Kiddle & Greeley
Attys.

UNITED STATES PATENT OFFICE.

BRADFORD H. LOCKE, OF DENVER, COLORADO.

MECHANISM FOR CONVERTING ROTARY INTO RECIPROCATORY MOTION.

SPECIFICATION forming part of Letters Patent No. 676,044, dated June 11, 1901.

Application filed February 23, 1900. Serial No. 6,174. (No model.)

*To all whom it may concern:*

Be it known that I, BRADFORD H. LOCKE, a citizen of the United States, residing in Denver, county of Arapahoe, State of Colorado, have invented certain new and useful Improvements in Mechanism for Converting Rotary into Reciprocatory Motion, of which the following is a specification, reference being had to the accompanying drawings, forming a part hereof.

This invention relates to mechanical movements or machine elements, and has for its object to produce a mechanism for converting rotary into reciprocatory motion which shall be adapted for various uses, and particularly for such uses as require a rapid reciprocation of a spindle, stem, shaft, or other equivalent, the movement of which in one direction is of the nature of a blow and is produced by gravity, by a spring, by a hammer, by air, gas, or steam under pressure, or by any other impelling force suited to the particular object in view.

The invention is particularly concerned with the means whereby the reciprocating part is raised against the action of gravity or moved against the spring or other impelling force, and is then released and permitted to move under the influence of such impelling force.

In accordance with the invention the improved mechanism comprises a rotating part, a reciprocating part, one of which parts is formed with an inclined or spiral shoulder, and a roller or rolling coupler which operatively engages or connects the rotating part and the reciprocating part traveling on said inclined or spiral shoulder for the purpose of effecting the movement of the reciprocating part in one direction, and is then caused to uncouple or disengage or disconnect the rotating part and the reciprocating part, so that the reciprocating part shall be released and permitted to move in the opposite direction under the influence of the impelling force.

The invention will be fully explained hereinafter with reference to the accompanying drawings, in which, for purposes of illustration and explanation, several practical embodiments of the invention are shown.

Figure 1:
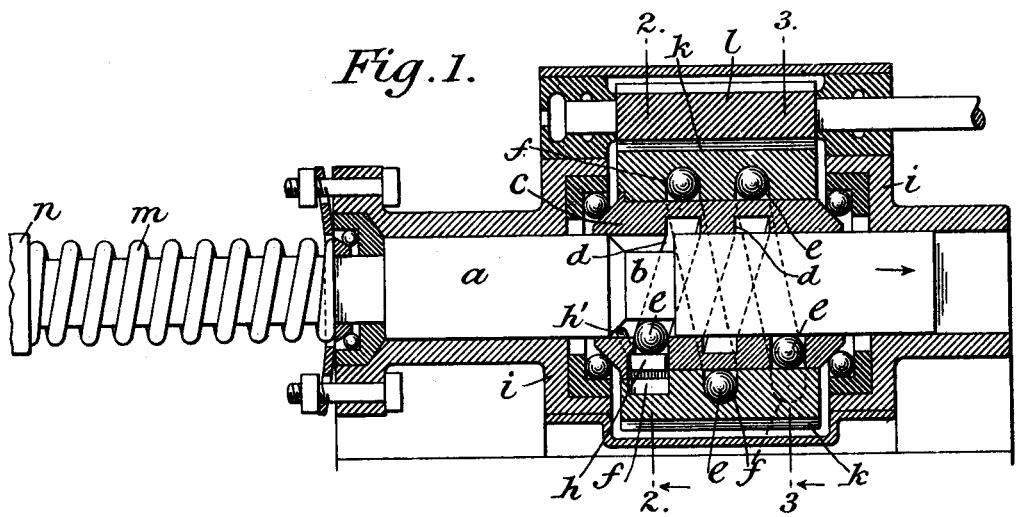
Figure 2:
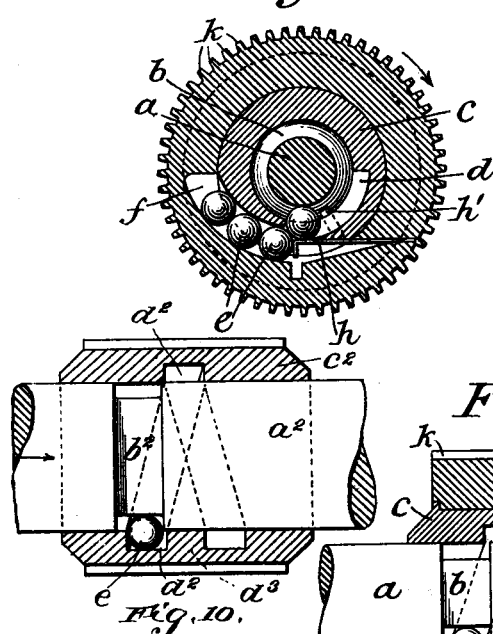
Figure 3:
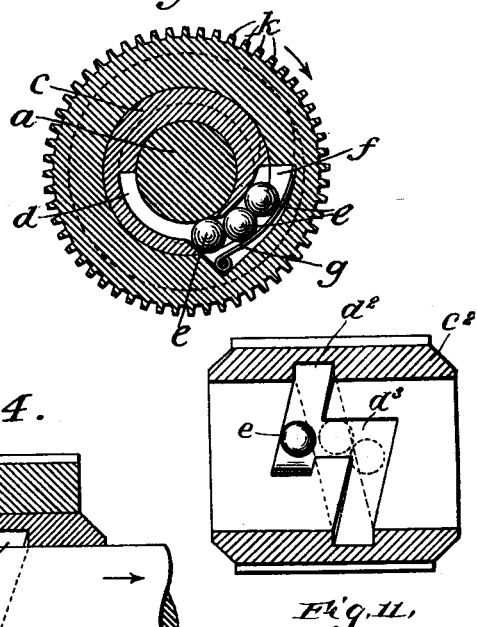
Figure 4:
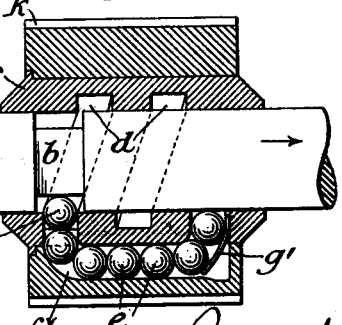
Figure 5:
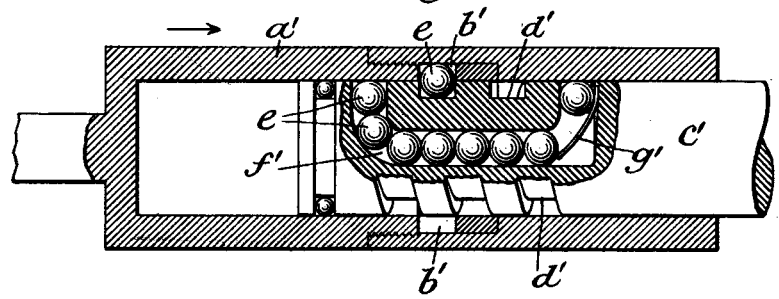
Figure 6:
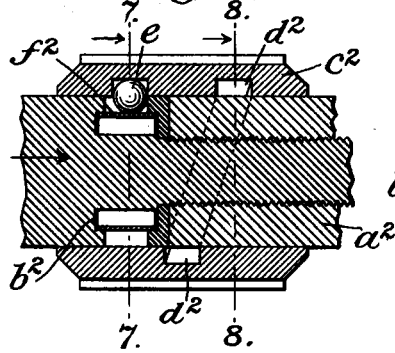
Figure 7:
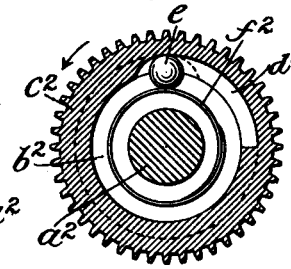
Figure 8:
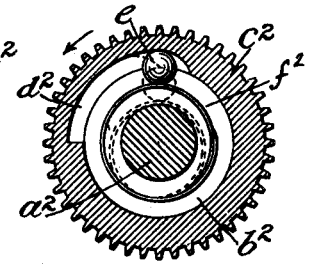
Figure 9:
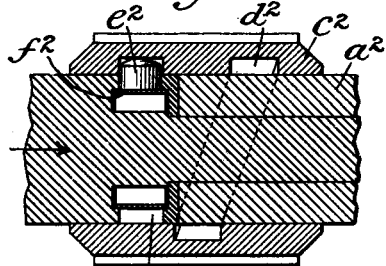

In the drawings, Figure 1 is a central longitudinal section of one form of mechanism which embodies the invention, with a suitable support therefor, the shaft being shown in elevation. Figs. 2 and 3 are transverse sections on the planes indicated by the lines 2 2 and 3 3, respectively, of Fig. 1. Fig. 4 is a view similar to Fig. 1, but illustrating a different embodiment of the invention, the support or casing being omitted. Fig. 5 is a central longitudinal section of another form of mechanism which embodies the invention, the shaft being represented partly in elevation and partly in section. Fig. 6 is a central longitudinal section of still another embodiment of the invention. Figs. 7 and 8 are transverse sections on the planes indicated by the lines 7 7 and 8 8, respectively, of Fig. 6. Fig. 9 is a view similar to Fig. 6, but showing another embodiment of the invention. Figs. 10 and 11 are detail views illustrating a further modification of the invention.

It will be understood that the several embodiments of the invention illustrated in the drawings are shown in a horizontal position merely for convenience and that the device in any form may be used in a vertical position or in any other position. It will also be understood that the spring shown in Fig. 1 and hereinafter referred to is shown merely as the representative of any suitable impelling force which may be employed to effect the movement in one direction of the reciprocating part, and that such impelling force may be of any suitable character, as hereinbefore indicated, according to the use to which the device is applied.

In the form of mechanism shown in Figs. 1, 2, and 3 the reciprocating part $a$ is shown as a shaft, stem, or spindle, referred to for convenience as a "shaft," though it may or may not be rotated. At a suitable point the shaft is provided with a circumferential groove $b$ to form a shoulder. In this form the rotating part $c$ is shown as a sleeve which receives the shaft with a free fit, so that the shaft may reciprocate freely within the sleeve, while the latter rotates freely about the shaft and is provided with an inclined or spiral groove $d$ to form an inclined or spiral shoulder. The third element of the device, as already indicated, is a coupler, which travels on the inclined or spiral shoulder of the one part, engaging the other part at the same time, so that one of such parts is moved longitudinally in one direction and then uncouples or releases or disengages the two parts, so that the longitudinally-movable part shall be permitted to move in the opposite direction under the influence of a suitable propelling force. It will be obvious, particularly when the several embodiments of the invention shown in the drawings have been described, that the "coupler," as it is herein termed for convenience, may assume different forms and that the uncoupling or disengagement or release of the rotating and reciprocating parts may be effected in various ways. It is also obvious that some form of a rolling coupler or roller free to travel about the part having the circumferential or annular shoulder will be the most desirable on account of the slight resistance offered and on account of the greater capacity of the device to adapt itself to different conditions, and in the form shown in Figs. 1, 2, and 3 the coupler is represented as a ball $e$, which during the movement of the reciprocating part in one direction is interposed between the shoulder formed by one side of the groove $b$ in the reciprocating part and the shoulder formed by groove $d$ in the other or rotating part, traveling on said inclined or spiral shoulder of the last-named part, the ball being received partly in one groove and partly in the other. The release of the reciprocating part for movement in the opposite direction to that effected by the inclined or spiral shoulder is accomplished in this form of the device by causing the coupler to move out of engagement with the shoulder $b$ and back through a suitable by-pass or return-channel $f$ to a point at the beginning of the inclined shoulder, where it again engages both shoulders, and so couples the two parts. The by-pass or return-channel $f$ is here shown as a spiral channel formed in the rotating part, which is represented as composed of two tubular parts, the one fitting tightly upon the other for convenience in manufacture. In this case a sufficient number of balls are employed to fill the by-pass or return-channel completely, so that as one ball enters the by-pass or return-channel, as shown in Fig. 3, it shall cause another ball to pass from the by-pass or return-channel, as shown in Fig. 2, into position for engagement with the rotating and the reciprocating part. A spring $g$ is secured in the entrance to the by-pass to assist in crowding the series of balls forward, and a spring $h$ is placed at the other end of the by-pass to release one ball at a time and insure its quick discharge from the return-channel. The spring $h$ is shown as provided with a pin $h'$, which projects into the groove $b$ in the reciprocating part when the groove is in position to receive it at the end of the forward movement. When the reciprocating part begins its backward movement through being coupled with the rotating part by the ball which has already passed into engagement with the spiral groove $d$, the other edge of the groove $b$, which is chamfered off, makes contact with the pin $h'$ and thrusts the spring $h$ back to release the next ball and permit it to be pushed forward into engagement with both grooves when the next forward movement is completed. It will be understood, of course, that but one ball at a time is in engagement with both the rotating part and the reciprocating part and that the reciprocating part after each ball has left its engagement with the inclined or spiral shoulder and before another ball passes into such engagement returns, under the influence of a suitable impelling force, from the position to which it was moved by the action of the inclined shoulder to its initial position.

In the construction shown in Figs. 1, 2, and 3 the reciprocating part and the rotating part are supported by a suitable casing $i$, suitable ball-bearings being provided for the rotating part, and the rotating part is provided with gear-teeth, as at $k$, to be engaged by a driving-pinion $l$. Any other suitable means for supporting and rotating the part $c$ may, however, be employed. The means for impelling the reciprocating part in a direction opposite to that in which it is moved by the inclined or spiral shoulder are represented in this case by a spring $m$, which is shown as confined between the end of the casing $i$ and a shoulder $n$ on the shaft or reciprocating part $a$, and it will be understood that any other suitable impelling means may be employed, the weight of the shaft and its attached parts being sufficient in some instances when the device is placed in a vertical position, or nearly so.

The form of the device shown in Fig. 4 differs from that shown in Fig. 1 only in making the by-pass or return-channel $f$ substantially straight or parallel with the axis, this arrangement requiring a smaller number of balls. A spring $g'$ is also shown in this case to assist in crowding the balls forward in the return-channel. It has not been attempted in this figure of the drawings nor in the remaining figures to illustrate any means for supporting the device nor for effecting the rotation of the rotating part nor for effecting the return movement of the reciprocating part, since such means may have any suitable form according to the particular use for which the device is intended, the form of such means shown in Figs. 1, 2, and 3 being merely representative of any suitable means.

It will be obvious that the arrangement of the reciprocating part and the rotating part, which is shown in Figs. 1, 2, and 3, may be reversed, as indicated in Fig. 5, in which the reciprocating part $a'$ is formed as a sleeve with an annular groove $b'$, while the rotating part $c'$ is formed as a shaft with an exterior spiral groove $d'$. The return-channel $f'$ in this instance is formed in the shaft itself. The operation of this form of the device is substantially the same as that of the form shown in Fig. 1 and need not be further described herein.

In the forms already described the spiral groove has been shown as having two or more complete turns, and a plurality of balls or couplers have been shown. It is obvious, however, that the number of turns which the spiral groove shall have will be determined in each case with due regard to the proper pitch of the spiral groove by the length of stroke which is desired for the reciprocating part. It will also be evident, as will now be explained, that a single ball or coupler can be used to advantage in place of the series of balls or couplers, only one of which in any case is in effective operation at one time.

In the construction shown in Figs. 6, 7, and 8 the sleeve $c^2$ is formed with a spiral groove $d^2$ to provide the necessary inclined shoulder, and the reciprocating part $a^2$ is provided with an annular groove $b^2$. In order to permit of the uncoupling of the rotating part and the reciprocating part or the release of the latter from the former, so that it may move under the influence of some suitable impelling force, as previously described, the ball or other coupler which travels on the inclined shoulder is arranged to move from engagement with said inclined shoulder by retiring into the groove $b^2$, which is made deep enough to accommodate the whole of the coupler when it is so retired. As clearly shown in Fig. 8, the end of the groove $d^2$ runs off to nothing, so that as the ball or other coupler reaches such end, as represented by dotted lines, it is forced into the groove $b^2$ against the pressure of a flat coiled spring $f^2$, which is placed in the groove, as shown in Fig. 6, and serves to throw the ball or coupler out again into engagement with the rotating part as soon as the reciprocating part has completed its forward movement. This spring also serves to press the ball into contact with the rotating part, so that the desirable rolling of the ball on the inclined shoulder shall be insured and the otherwise possible slipping of the ball with respect to the inclined shoulder prevented.

The construction shown in Fig. 9 is the same as that shown in Fig. 6 except that a cylindrical roller or disk $e^2$ is shown as one of the possible substitutes for the ball $e$ as a coupler for the rotating part and the reciprocating part.

As another possible provision for the release of the reciprocating part after the completion of its backward movement, particularly in a construction where the spiral groove has a single complete turn a return-channel $d^3$ may be formed directly from one end of the spiral groove to the other, as shown in Figs. 10 and 11, so that as soon as the ball or other coupler reaches the end of the spiral groove it will pass at once into the other end in the forward movement of the reciprocating part under the influence of the impelling force.

Various other changes in the form and arrangement of the parts will suggest themselves in view of the foregoing, and it will therefore be understood that the invention is not to be restricted to the particular embodiments thereof which have been shown and described herein.

I claim as my invention—

1. A device for converting rotary into reciprocatory motion comprising a sleeve, a shaft passing freely through the sleeve, one of said parts being arranged to rotate and the other of said parts being arranged to reciprocate, one of said parts having an inclined or spiral shoulder, a rolling coupler for said parts arranged to travel on said shoulder and engaging the other part to cause longitudinal movement of the reciprocating part in one direction, provisions whereby the disengagement of said coupler from said shoulder at one end of the movement of the reciprocating part and the engagement of the coupler with said shoulder at the other end of such movement are permitted, and means to move the reciprocating part in a direction opposite to that of the movement effected by said shoulder and roller, substantially as shown and described.

2. A device for converting rotary into reciprocatory motion comprising a sleeve, a shaft passing freely through the sleeve, one of said parts being arranged to rotate and the other of said parts being arranged to reciprocate, one of said parts having an inclined or spiral shoulder, a roller arranged to travel on said shoulder and engaging the other part to cause longitudinal movement of the reciprocating part in one direction, provisions whereby the disengagement of said roller from said shoulder at one end of the movement of the reciprocating part and the engagement of the coupler with said shoulder at the other end of such movement are permitted, and means to move the reciprocating part in a direction opposite to that of the movement effected by said shoulder and roller, substantially as shown and described.

3. A device for converting rotary into reciprocatory motion comprising a sleeve, a shaft passing freely through the sleeve, one of said parts being arranged to rotate and the other of said parts being arranged to reciprocate, one of said parts having an inclined or spiral shoulder, a roller arranged to travel on said shoulder and engaging the other part to cause longitudinal movement of the reciprocating part in one direction, means to move said roller into and out of engagement at opposite ends of the movement of the reciprocating part, and means to move the reciprocating part in a direction opposite to that of the movement effected by said shoulder and roller, substantially as shown and described.

4. A device for converting rotary into reciprocatory motion comprising a sleeve, a shaft passing freely through the sleeve, one of said parts being arranged to rotate and the other of said parts being arranged to reciprocate, one of said parts having an inclined or spiral shoulder, a roller arranged to travel on said shoulder and engaging the other part to cause longitudinal movement of the reciprocatory part in one direction, one of said parts having a chamber or channel adapted to receive said roller and permit the disengagement thereof from said shoulder, means to cause said roller to move into said chamber or channel at one end of the movement of the reciprocating part and to move said roller again into engagement with said shoulder at the other end of such movement, and means to move the reciprocating part in a direction opposite to that of the movement effected by said shoulder and roller, substantially as shown and described.

5. A device for converting rotary into reciprocatory motion comprising a sleeve, a shaft passing freely through the sleeve, one of said parts being arranged to rotate and the other of said parts being arranged to reciprocate, one of said parts having an inclined or spiral shoulder and the other of said parts having a circumferential shoulder, a roller arranged to travel on said inclined or spiral shoulder and engaging said circumferential shoulder to cause longitudinal movement of the reciprocating part in one direction, provisions whereby the disengagement of said roller from said inclined or spiral shoulder at one end of the movement of the reciprocating part and the engagement of the coupler with said inclined or spiral shoulder at the other end of such movement are permitted, and means to move the reciprocating part in a direction opposite to that of the movement effected by said inclined or spiral shoulder and roller, substantially as shown and described.

6. A device for converting rotary into reciprocatory motion comprising a sleeve, a shaft passing freely through the sleeve, one of said parts being arranged to rotate and the other of said parts being arranged to reciprocate, one of said parts having a spiral groove and the other of said parts having a circumferential groove, a roller arranged to travel in said spiral groove and to engage said circumferential groove, a spring arranged in said circumferential groove to press the roller into said spiral groove, said circumferential groove having a sufficient depth to receive said roller wholly, and said spiral groove being reduced at its end to press the roller into said circumferential groove against the spring, and means to move the reciprocating part in a direction opposite to that of the movement effected by said spiral groove and roller, substantially as shown and described.

7. A device for converting rotary into reciprocatory motion comprising a sleeve, a shaft passing freely through the sleeve, one of said parts being arranged to rotate and the other of said parts being arranged to reciprocate, one of said parts having an inclined shoulder and the other of said parts having a circumferential groove, a roller arranged to travel in contact with said shoulder and to engage said circumferential groove, a spring arranged in said circumferential groove to press the roller into contact with the other part, and means to move the reciprocating part in a direction opposite to that of the movement effected by said shoulder and roller, substantially as shown and described.

This specification signed and witnessed this 9th day of February, A. D. 1900.

BRADFORD H. LOCKE.

In presence of—
ANTHONY N. JESBERA,
LOUIS R. MOORE.